Feb. 27, 1968  H. WEIER  3,370,626
FRUIT AND VEGETABLE DISINTEGRATOR AND SEPARATOR
Filed Sept. 10, 1965

Inventor
Heinrich Weier

By
Cushman, Darby & Cushman
Attorneys

United States Patent Office 3,370,626
Patented Feb. 27, 1968

3,370,626
FRUIT AND VEGETABLE DISINTEGRATOR
AND SEPARATOR
Heinrich Weier, Schlatt-Zurich, Switzerland
(35 Goldwandstrasse, 5400 Ennetbaden, Switzerland)
Filed Sept. 10, 1965, Ser. No. 486,481
Claims priority, application Switzerland, Sept. 10, 1964,
11,815/64
10 Claims. (Cl. 146—76)

The present invention relates to fruit or vegetable presses and is particularly concerned with such a press of the type which comprises a casing, a rotor located in the casing and separate outlet apertures for the pulp and for the treated juice products.

In the presses for fruits of this type already known, a filter is generally fixed to the rotor, and has a conical form, and the pulp is removed by centrifugal force, being pressed up against the conical surface of the filter and slides radially across said surface. Also known are fruit and vegetable presses in which the filter is fixed. The filter is cylindrical and the rotor, situated on the interior, entrains the pulp axially and on rotation describes a helicoidal path during which centrifugal force presses the pulp against the filter.

None of the known different devices gives entirely satisfactory results in practice. Their principle disadvantage is that they do not permit separation of the juice from the pulp in a proportion sufficient for the operation to be really economical. In the most favourable operation, one can extract a quantity of juice equal to 50% by weight of the fresh product; it is significant that the best part of the juice is still retained in the pulp.

The present invention has for its object the provision of a fruit or vegetable press of the type mentioned which permits the extraction from fruit or from vegetables of a proportion of the juice which is clearly better than that which has been obtained with the known apparatus.

For this purpose the fruit or vegetable press of the present invention comprises a fruit and vegetable press comprising a casing, a rotor rotatable within said casing, a filter positioned adjacent said rotor, a first outlet aperture for juice extracted by fruit or vegetable material being pressed by said rotor against said filter, a second outlet for the resulting pulp means on said rotor for guiding the pulp in a centripetal direction while it is displaced along the path in contact with said filter.

The accompanying drawings represent, by way of example, one embodiment of press according to the invention.

Figure 1:
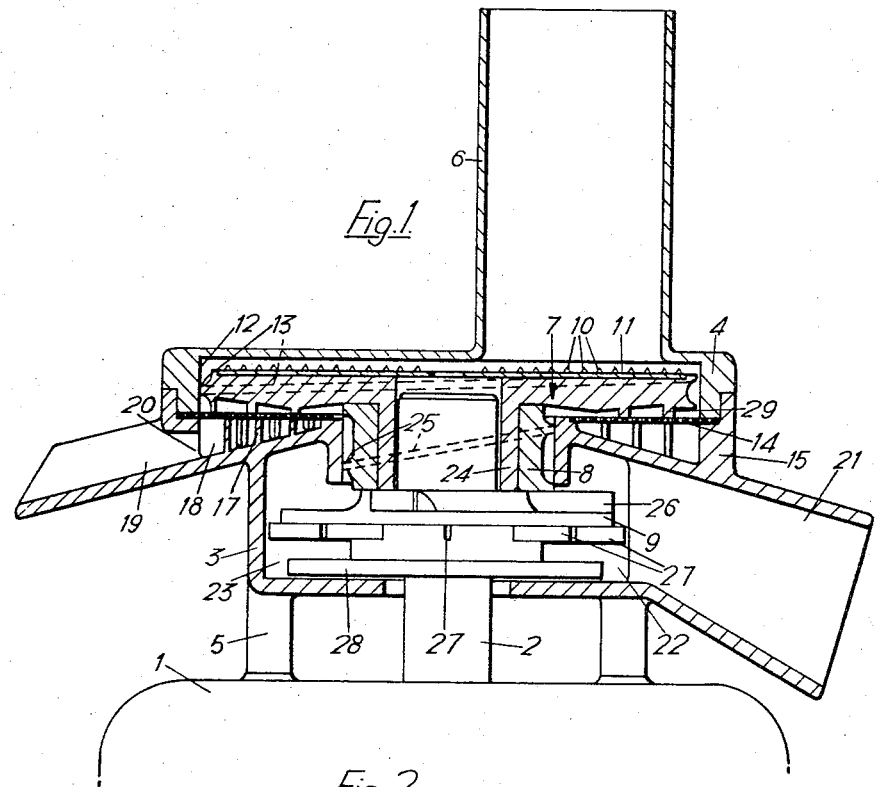
Figure 2:
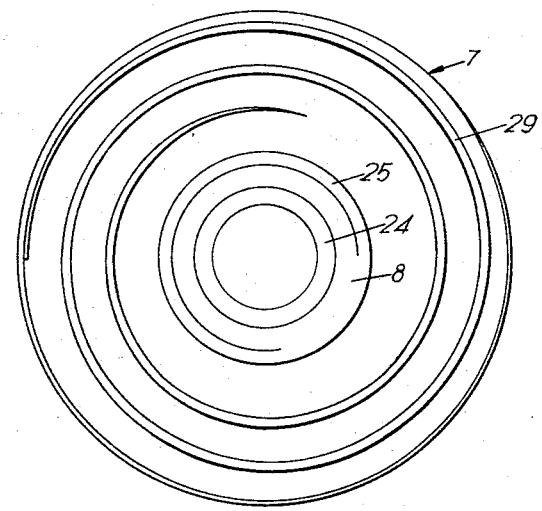

In the drawings:
FIGURE 1 is a side elevational view partly in axial section of the press; and
FIGURE 2 is a plan view from below of the rotor of this press.

The fruit press represented in the drawings forms an auxiliary apparatus for a domestic mixing machine which comprises a base 1 at the interior of which is located a motor and a vertical shaft 2, the extremity of which projects from the upper part of the base 1. The drive shaft 2 can be connected directly to the drive shaft of the motor or can equally well form the secondary shaft of a gear box driven by the motor.

The press comprises a casing in two halves 3 and 4 of which one half 3 is the main part and which includes feet 5 which bear on the base 1. The casing 3 is fixed to the base 1 in a removable fashion by means not shown. The other part 4 of the casing forms a removable cover which is connected to the casing in a substantially liquid-tight manner. The cover 4, like the casing 3, is of generally cylindrical form. The cover 4 is provided on its upper face with an eccentric tubular pipe 6 which forms the inlet opening to the casing and which is normally covered by a closure element (not shown) having a projecting portion which projects into the interior of the tube 6 and which permits the compression of the products introduced into said tube. On the drive shaft 2 is fixed a rotor formed in three parts, namely a disc 7, an entrainment tube 8 and an extractor 9.

While the parts 3 and 4 of the casing can be formed by moulding from a rigid plastics material, the disc 7 of the rotor is metallic. It has an upper face which is substantially planar and circular and from which project triangular cutting elements 10. These last are formed by cutting and bending up a thin metal sheet 11 which is fixed for example by sticking or by welding on the disc 7. The cutting elements 10 constitute a rotating rasp capable of splitting up the fruit or vegetables, introduced into the tube 6, into fine particles and entraining them in the narrow space formed between the cover and the rotor. These particles are then subjected to centrifugal force and tend to be displaced radially outwardly. The particles are then forced up against the internal cylindrical face 12 of the cover 4, which defines the interior of the said space and which faces the edge of the disc 7. The thickness of the latter is several millimeters and the lateral face forms a helicoidal channel defined by a thread 13 of which the pitch and the direction are chosen so that the material is forced radially towards the exterior against the face 12 and are entrained axially towards the base by the rotation of the disc 7.

The base 3 of the casing carries in the upper part a thin metallic plate 14 which is of circular annular form and is pierced by very fine orifices to form a filter. This plate is fixed to the casing 3 and extends coaxially with respect to the drive shaft 2 and forms the bottom of the circular space which extends under the cover 4 and under the disc 7. The filter 14 is supported exteriorly and interiorly by the parition elements 15 and 16 which are formed on the casing 3. It is further supported by the circular ribs 17 which are provided with orifices and which occupy a housing 18 in the casing 3, under the disc 14. The bottom of the housing 18 has a truncated conical form being deeper at the outer part. It communicates with an outlet channel 19 by means of an opening 20, the channel 19 extending radially outwardly and permitting collection of the extracted juice from the treated product.

With regards to the pulp, this can be collected at the outlet of a channel 21, which also extends radially outwardly opposite to the channel 19, and communicates, by means of an opening 22, with an annular chamber 23 formed at the interior of the casing 3, the channel 21 extending under the housing 18 from which it is entirely separate.

To arrive in the chamber 23 the pulp follows a centripetal path. It passes between the disc 7 and the filter 14 and arrives in contact, at the interior edge of the filter, with the lateral face of the tube 8 which is keyed on a tubular extension 24 of the disc 7.

In a similar manner to the lateral face of the disc 7, the tube 8 is formed with helicoidal ribs 25 which provide the means of axial entrainment for the pulp which arrives at the interior edge of the filter. As can be seen from the drawings, the partition 16 of the casing 3 surrounds the tube 8 and defines with the latter a helicoidal channel in which the pulp can only progress towards the bottom. The helicoidal channel opens into the chamber 23. The pulp of the fruit or vegetables arrives in this chamber in the form of a compressed mass betwen the tube 8 and the partition 16, the pulp mass being sectioned into little pieces by the extractor 9 of which the upper part has three ribs 26 extending radially from the top of a flat disc. Under the disc also extend eight radial ribs 27 of which the outer extremeties are situated in close proximity to the lateral wall of the chamber 23. The rest of the pulp which can amass between the extractor and the wall of the chamber 23 is dislodged by the ribs 27 and is projected into the channel 21. Finally the extractor 9 also includes a lower disc 28 which prevents all penetration of the pulp into the space between the base and the motor shaft.

In the described apparatus an extremely thorough separation of the pulp and of the juice is obtained by virtue of the particular disposition of the disc 7 which will be further described. In the lower face turned towards the filter 14, the disc 7 is provided with a spiral rib 29 (FIGURE 2) of which the sense is determined as a function of the direction of rotation of the disc so that the pulp, which arrives at the periphery of the filter, can be entrained radially towards the centre. The rib 29 presents vertical flanks and acts as the rotor of a pump to push the pulp towards the centre against the centrifugal force effect. The pulp is thus compressed against the flank of the rib and the juice which is extracted can run towards the bottom by passing through the orifices of the filter 14. It is then collected in the housing 18. As the pulp is not applied by centrifugal force against the filter, the orifices of the latter do not tend to become clogged.

One can furthermore, without risk of closing the orifices, increase the extraction of juice by exercising a light pressure in the axial direction on the pulp which is on the top of the filter 14. To exercise this pressure, the lower face of the disc 7 is between the spirals of the ribs 29, of slightly conical form. At its periphery, the disc is slightly inclined downwardly in approaching the axis, the inner part being inclined upwardly. Thus, during the greater part of its passage across the filter 14, the pulp is subjected to a progressive compression against the filter since it is displaced in a channel defined by the lower face of the disc 7, by the ribs 29 and by the filter 14, the cross-section of this channel diminishing progressively. The ribs 29 terminate at the point where the lower face of the disc 7 is closest to the filter. During the last part of the displacement of the pulp on the top of the filter, a decompression of the pulp is produced, which facilitates the axial entrainment by the ribs 25.

The rotor of the described apparatus is of relatively small dimensions and can thus easily be driven at a high speed, in such a way that one obtains a relatively large output and at the same time a very good separation of the pulp and juice. It has been shown, for example, that the described apparatus permits the preparation of carrot juice in which the weight of the juice obtained equals 70% of the weight of the fresh product.

I claim:
1. A fruit and vegetable press comprising a casing, a rotor rotatable within said casing, a filter positioned adjacent said rotor, a first outlet aperture for juice extracted by fruit or vegetable material being pressed by said rotor against said filter, a second outlet for the resulting pulp and means on said rotor for guiding the pulp in a centripetal direction while it is displaced along a path in contact with said filter.

2. A press according to claim 1 wherein the guide means defines with the filter, a channel of which the cross-section diminishes progressively for at least a part of the length of the path which the pulp follows.

3. A press according to claim 1 wherein the rotor comprises a disc plate having on one of its faces a spiral rib constituting the guide means.

4. A press according to claim 1 wherein the filter is formed by a thin and flat disc situated facing the said face of the rotor.

5. A press according to claim 1 wherein the rotor is provided with rasp elements on its other face.

6. A press according to claim 5 wherein the casing includes a removable lid having an upper wall closely adjacent to said other face of the rotor.

7. A press according to claim 6 wherein the removable lid has an upwardly extending feed tube into which the fruit or vegetable may be pressed by a removable cap.

8. A press according to claim 1 wherein said filter is fixed.

9. A press according to claim 1 wherein said rotor includes a peripheral face, said peripheral face including a helicoidal groove.

10. A press according to claim 1 wherein said rotor comprises a disc, a lower face to said disc, a spiral rib on said lower face, said rib constituting said guide means, a central tubular portion extending downwardly from said lower face, a helicoidal groove formed on said tubular portion and a surrounding cylindrical portion on said casing closely adjacent said helicoidal groove effective to guide pulp downwardly from said rotor disc.

References Cited
UNITED STATES PATENTS 3,203,457   8/1965   Minet _____ 146—76

FOREIGN PATENTS 9,130   1913   Great Britain.

W. GRAYDON ABERCROMBIE, *Primary Examiner.*